July 24, 1923.　　　　　　　　　　　　　　　1,462,974
P. MAKOWSKI
AUTOMATIC CLUTCH SHIFTING MECHANISM FOR WASHING MACHINES
Filed March 3, 1923　　　　　4 Sheets-Sheet 3
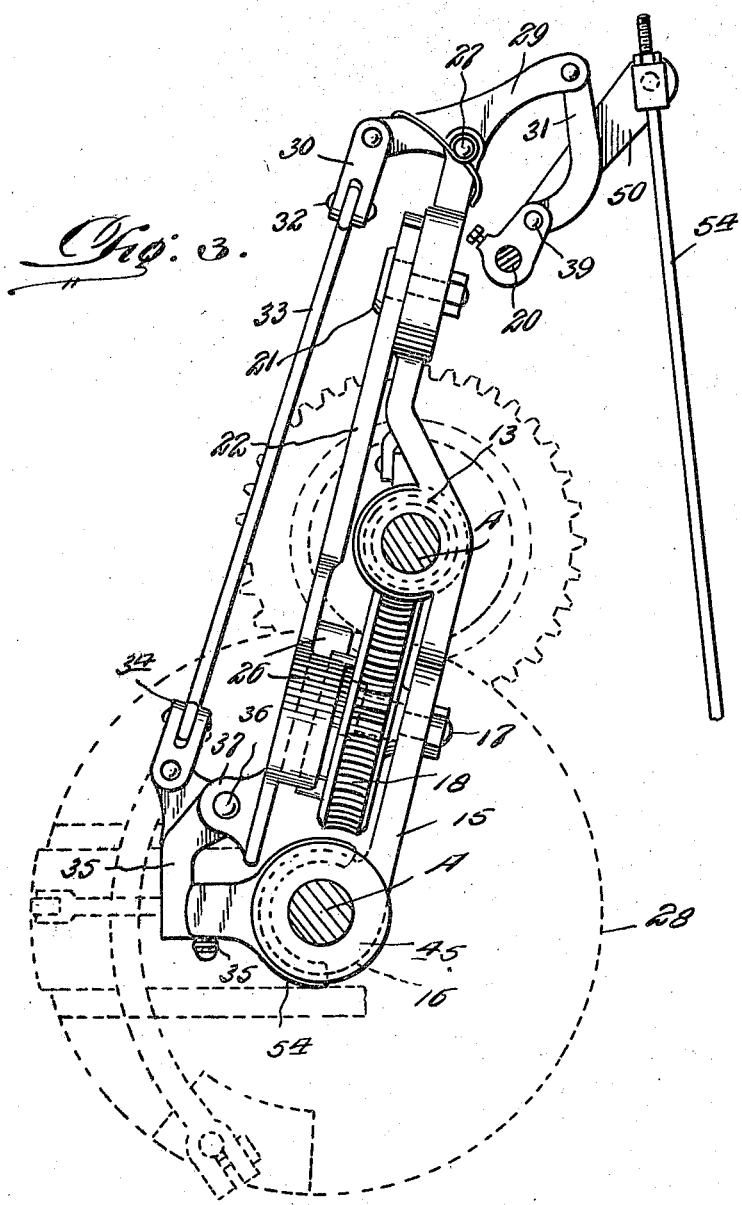
Peter Makowski, Inventor

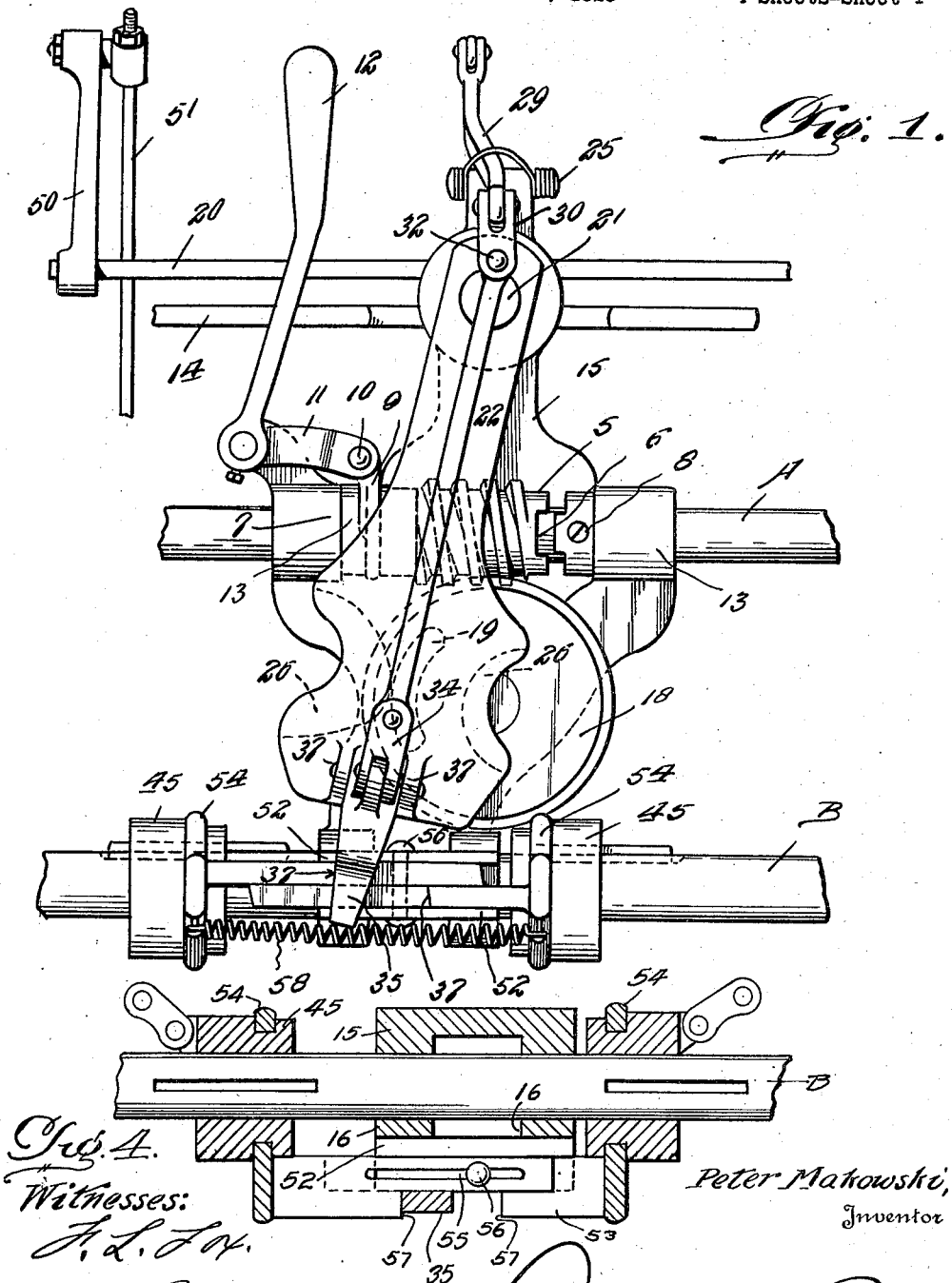

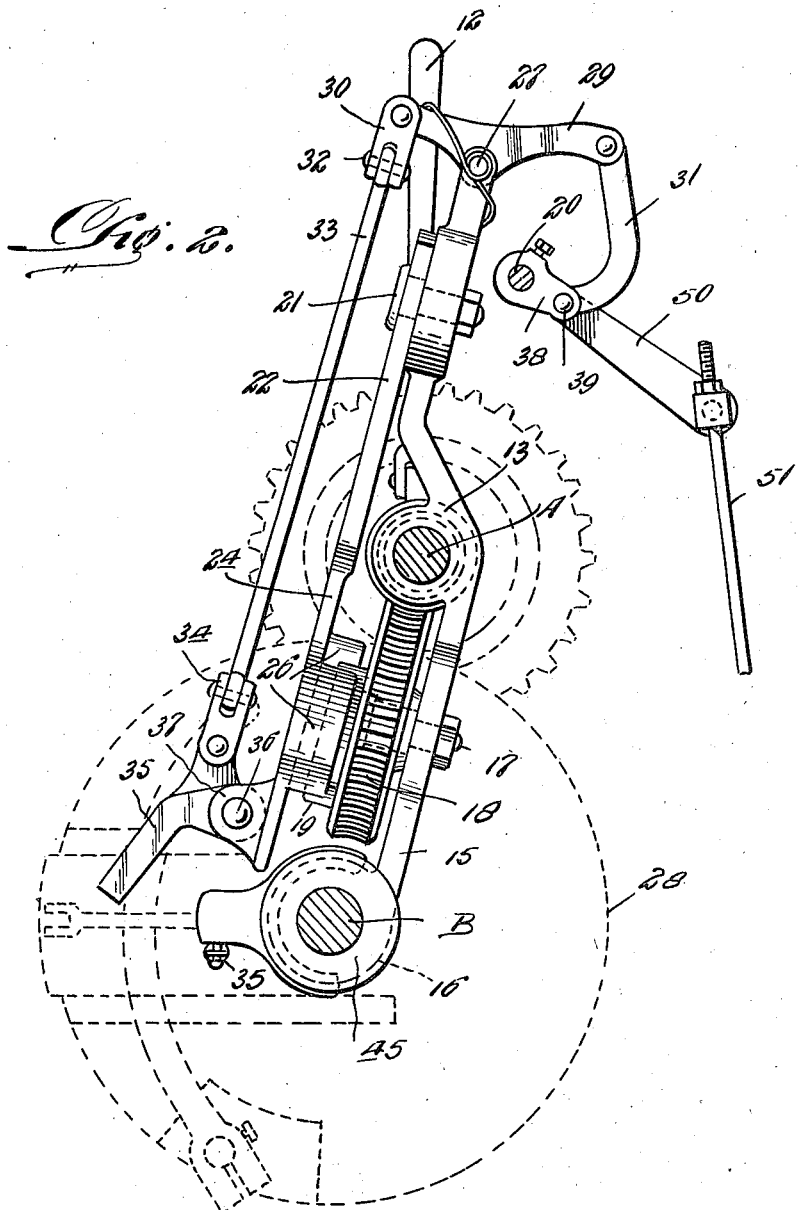

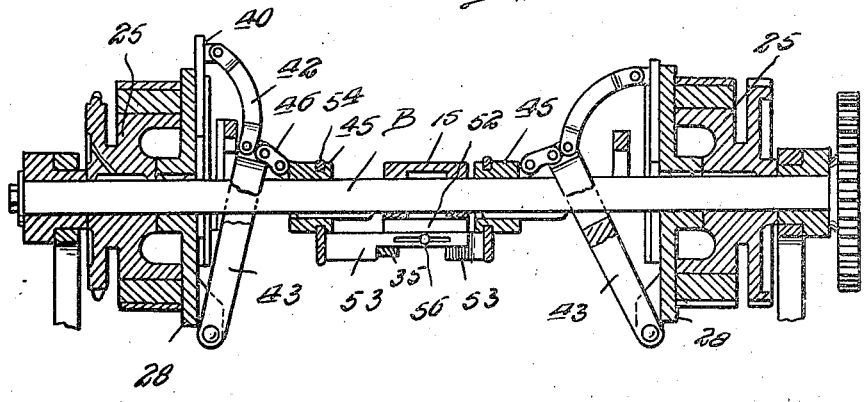
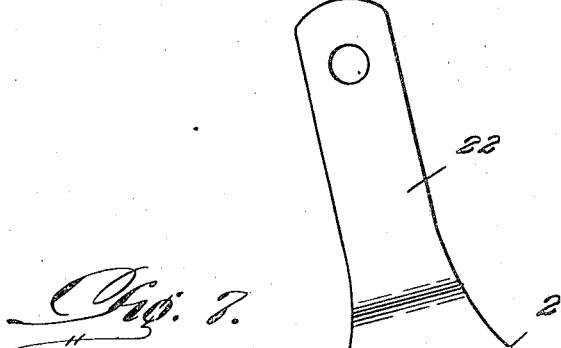
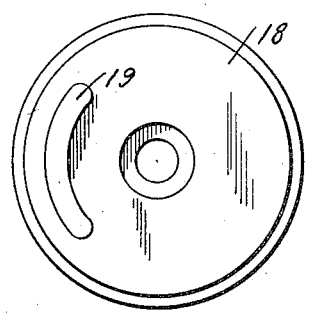

Patented July 24, 1923.

1,462,974

UNITED STATES PATENT OFFICE.

PETER MAKOWSKI, OF CHICAGO, ILLINOIS.

AUTOMATIC CLUTCH-SHIFTING MECHANISM FOR WASHING MACHINES.

Application filed March 3, 1923. Serial No. 622,482.

*To all whom it may concern:*

Be it known that I, PETER MAKOWSKI, a citizen of the United States, residing at Chicago, in the county of Cook and State of Illinois, have invented certain new and useful Improvements in Automatic Clutch-Shifting Mechanism for Washing Machines, of which the following is a specification.

The primary object of my said invention resides in the provision of an automatic clutch shifting mechanism for washing machines, particularly adapted for application to a washing machine shown in Patent No. 1,436,718, granted to me under date of November 28th, 1922.

A further object of the invention is to substantially improve over the type of clutch reversing mechanism shown in the above mentioned patent, this improvement consisting of a substantial reduction in the number of structural elements embodied in the clutch shifting mechanism, as well as the obtainance of a higher efficiency of operation.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1—is a front elevational view of my improved clutch shifting mechanism.

Figures 2 and 3—are side elevational views, showing respectively, different positions of certain of the elements of the clutch shifting mechanism.

Figure 4—is a detail cross sectional view of a certain portion of the shifting mechanism.

Figure 5—is a plan view of a cam wheel forming a part of this invention.

Figure 6—is a horizontal sectional view through the clutch elements, together with their associate mechanism, and Figure 7—is an elevational view of the clutch shifting arm, per se.

In the several views, the reference character A designates the main drive shaft of the washing machine shown in the above mentioned patent; B, the shaft of the reversing mechanism which is parallel with the shaft A; 14 the cross bar at the upper end of the machine frame, and directly beneath the rock shaft 20; 23 the arm upon the end of the rock shaft 20; 25 the clutch drums upon the said shaft B of the reversing mechanism; 28 the clutch drum disks; 40 the sliding plates of the clutches; 42 the connecting links between the plates 40 and rocking levers 43 of the clutch mechanism; 45 the throw collars which are splined upon the said shaft B, and 46 the connecting links between the said throw collars 45, and clutch contacting levers 43. All of the above elements are clearly shown and described in the said above mentioned patent, and a detailed description of these elements is believed unnecessary. My improved clutch shifting mechanism per se embodies the provision of a worm tube 5, slidable upon the main drive shaft A of the washing machine, one end of this tube being formed with a clutch 6, and the other end thereof being formed with a circumferentially grooved collar 7. Keyed upon the said shaft A is a clutch collar 8 and engaging within the said groove of the collar 7 of said worm tube 5 is a yoke 9, the upper end of this yoke being pivotally secured as at 10 to a link 11, which link is actuated in reverse directions, through a hand lever 12, for consequently throwing the said worm tube 5 into and out of engagement with the said clutch collar 8 upon the shaft A.

Upon the said main drive shaft A of the washing machine is loosely disposed a pair of collars 13, the same being formed upon an arm or plate 15, the said worm tube 5 and clutch collar 8 being disposed between the said collars 13 of the arm or plate 15. The lower end of this arm or plate 15 is also formed with a pair of spaced collars 16, which encircle the said shaft B. Rotatably mounted upon the front face of the arm or plate 15 through the instrumentality of a stub pin 17, and between the said shafts A and B, is a worm gear 18, the same being always in mesh with the said worm tube 5 upon the drive shaft A, this worm gear being formed upon its front face with an arcuate shoulder 19 adjacent the periphery thereof, and shown more clearly in Figure 5.

Loosely pivotally secured as at 21 adjacent the extreme upper end of the arm or plate 15 is the upper end of a rocking arm 22, the lower end of the same being enlarged as at 24, and being formed upon the inner face of this enlargement with a pair of spaced arcuate shaped shoulders 26, between which rides the said arcuate shaped shoulder 19, of the worm gear 18. Pivoted as at 27 to the extreme upper end of the arm or plate 15 is a rocking lever 29, the front end thereof being pivotally secured to a link 30, while the opposite end is similarly secured to a relatively longer link 31. Pivoted as at 32 to the first mentioned link 30 is a rod 33, the same extending parallel with the arm or plate 15, and being connected at its lower end through the instrumentality of a link 34 with a rocking pin 35, this pin being pivoted as at 36 between a pair of spaced ears 37 formed upon the lower end of the said arm or plate 15 for functioning in a manner hereinafter more fully described.

Upon the said rock shaft 20 of the washing machine, and directly beneath the before mentioned rocking arm 29, is a link 38, the same being rigidly secured to the rock shaft 20 at one end, and being pivotally secured as at 39 to the before mentioned link 31.

Upon one end of the rock shaft 20 is an arm 50, similar in all respects to the arm 23 upon the rock shaft 20 shown in my washing machine patent. Secured to the upper end of this arm 50 in any manner desirable, is a rod 51, the same being substituted in place of the cable 24 shown in this patent and extending downwardly to the combined manual and automatic clutch shift mechanism of the washing machine, and being connected thereto in a manner similar to the said cable 24 of the washing machine patent.

The said pair of collars 16 upon the lower end of the arm or plate 15 encircle the shaft B between the before mentioned pair of throw collars 45 that are splined upon this shaft, these collars being formed with a pair of forwardly projecting spaced plates 52. Slidably disposed between the said spaced plates 52 of the collars 16 are sliding arms 53, in overlapped relation with each other, the outer ends of each being formed with rearwardly extending yokes 54 that engage in annular grooves respectively, formed in the said clutch throw collars 45, these yokes 54 being similar in all respects to the yokes 62 of the carriage mechanism 57 shown in my previous patent. Each of these arms 53 are longitudinally slotted as at 55 for a portion of their length, these arms being slidably connected between the said plates 52 of the collars 16 by a pin 56, between the said plates and engaging through the slots in the said arms 53. The arms 53 are shouldered as at 57 and between the shoulders of the respective arms is disposed the before mentioned pivoted rocking pin 35. The throw collars 45 are maintained in close relation with the said collars 16 of the plate or arm 15, through the instrumentality of a coiled spring 58, the same being connected at its opposite ends to the said yokes 54.

In view of the above description, it will at once be apparent that when the worm tube 5 is slid into engagement with the clutch collar 8 and the shaft A is being driven, the worm wheel 18 will be consequently rotated for rocking the member 22 upon its pivot 21, and when the rocking pin 35 is in a position between the shoulders 57 of the said sliding plates 53, the throw collars 45 will be selectively moved backwards and forwards upon the shaft B of the reversing mechanism, for consequently actuating first one clutch upon the shaft B, and by the other for consequently reversing the rotation of the shaft B. The nature of my clutch mechanism is such that one clutch is being slowly locked, while the other clutch is being released, thereby slowing down the rotation of the washing drum before the same is rotated in a reverse direction for effectively overcoming all shocks and strains occasioned by the reversal of movement of the washing drum. Whenever a pull is applied to the rod 51, the shaft 20 will be consequently rocked, the rocking movement of this shaft consequently effecting the upward swinging movement of the pin 35, thereby releasing the same from between the shoulders 57 of the clutch throw plates, permitting the spring 58 to draw inwardly upon both of these clutch collars for consequently throwing out of engagement, both of the clutches, which will thereby cut off the power to the reversing shaft B. Further, the hand lever 12 may be so actuated as to release the worm tube 5 from the clutch collar 8, thereby stopping the movement of the bevelled gear 18, which will also effectively stop the rotation in reverse directions of the said shaft B.

While I have herein shown and described the preferred embodiment of the present invention, it is nevertheless to be understood that minor changes may be made therein, without departing from the spirit and scope of the invention as claimed.

Having thus described my invention, what I claim as new is:—

1. In a clutch reversing mechanism for washing machines, wherein the said washing machine includes a drive shaft and a reversing shaft together with a pair of clutch elements upon said reversing shaft, and wherein the washing machine further includes a pair of throw collars upon the reversing shaft for the said pair of clutch elements, a swinging member actuated by said drive shaft and being disposed between said throw collars, and means for withdrawing said swinging member from between the said throw collars.

2. In a clutch reversing mechanism for washing machines, wherein the said washing machine includes a drive shaft and a reversing shaft together with a pair of clutch elements upon said reversing shaft, and wherein the washing machine further includes a pair of throw collars upon the reversing shaft for the said pair of clutch elements, a swinging member actuated by said drive shaft and being disposed between said throw collars, and means for withdrawing said swinging member from between the said throw collars, and means for actuating said swinging member.

3. In a clutch reversing mechanism for washing machines, wherein the said washing machine includes a drive shaft and a reversing shaft together with a pair of clutch elements upon said reversing shaft, and wherein the washing machine further includes a pair of throw collars upon the reversing shaft for the said pair of clutch elements, a swinging member actuated by said drive shaft and being disposed between said throw collars, means for withdrawing said swinging member from between the said throw collars, means for actuating said swinging member, and means for cutting out said actuating means.

4. In a clutch reversing mechanism for washing machines, wherein the said washing machine includes a drive shaft and a reversing shaft together with a pair of clutch elements upon said reversing shaft, and wherein the washing machine further includes a pair of throw collars upon the reversing shaft for the said pair of clutch elements, a swinging member actuated by said drive shaft and being disposed between said throw collars, and means for withdrawing said swinging member from between the said throw collars, and means for normally maintaining said throw collars in position to maintain said clutch elements inoperative.

5. In a clutch reversing mechanism for washing machines, wherein the said washing machine includes a drive shaft and a reversing shaft, together with a pair of clutch elements upon said reversing shaft, and wherein the washing machine further includes a pair of throw collars upon the reversing shaft for the said pair of clutch elements, a swinging member actuated by said drive shaft and being disposed between said throw collars, means for withdrawing said swinging member from between the said throw collars, means for normally maintaining said throw collars in position to maintain said clutch elements inoperative, said means comprising a spring connection between said throw collars.

6. In a clutch reversing mechanism for washing machines, wherein the washing machine includes a drive shaft and a reversing shaft, together with a pair of clutch elements upon said reversing shaft, and wherein the said machine further includes a pair of throw collars upon the reversing shaft for the said pair of clutch elements, a clutch collar upon said drive shaft, a worm tube also upon said drive shaft, and having a clutch edge for engagement with said clutch collar, means for disengaging said tube from said clutch collar, a worm gear rotatable between said shafts and in mesh with said worm tube, a swinging arm actuated by said worm gear, means between said swinging arm and the said throw collars whereby the same are actuated for opening and closing the said clutch elements upon the reversing shaft.

In testimony whereof I affix my signature.

PETER MAKOWSKI.